(12) United States Patent
Schonfeld

(10) Patent No.: US 7,896,384 B2
(45) Date of Patent: Mar. 1, 2011

(54) MODULAR STROLLER

(75) Inventor: Julia Dinah Schonfeld, New York, NY (US)

(73) Assignee: Julia Schonfeld, New York, NY (US)

( * ) Notice: Subject to any disclaimer, the term of this patent is extended or adjusted under 35 U.S.C. 154(b) by 553 days.

(21) Appl. No.: 11/700,495

(22) Filed: Jan. 31, 2007

(65) Prior Publication Data

US 2008/0179863 A1      Jul. 31, 2008

(51) Int. Cl.
   *B62B 7/00*   (2006.01)
   *B62B 9/00*   (2006.01)
(52) U.S. Cl. ............... 280/647; 280/657; 280/47.38
(58) Field of Classification Search ............... 280/38, 280/642, 643, 647, 648, 650, 657, 658
   See application file for complete search history.

(56) References Cited

U.S. PATENT DOCUMENTS

| | | | | |
|---|---|---|---|---|
| 556,168 | A * | 3/1896 | Taylor | 280/209 |
| 1,707,186 | A * | 3/1929 | Chatfield | 280/658 |
| 1,934,396 | A * | 11/1933 | Bales | 297/58 |
| 3,383,738 | A * | 5/1968 | Fox et al. | 24/306 |
| 4,083,579 | A * | 4/1978 | Basey et al. | 280/650 |
| 4,805,938 | A * | 2/1989 | Redmond et al. | 280/47.35 |
| 5,221,106 | A * | 6/1993 | Shamie | 280/644 |
| 5,333,893 | A * | 8/1994 | Chen | 280/642 |
| 5,522,121 | A * | 6/1996 | Fraynd et al. | 24/335 |
| 5,769,448 | A * | 6/1998 | Wang | 280/642 |
| 5,918,892 | A * | 7/1999 | Aaron et al. | 280/47.38 |
| 6,431,579 | B1 * | 8/2002 | Kaneko et al. | 280/642 |
| 6,527,294 | B1 * | 3/2003 | Brewington et al. | 280/647 |
| 6,601,866 | B1 * | 8/2003 | Dobies | 280/304.1 |
| D484,075 | S * | 12/2003 | Kassai | D12/129 |
| 6,752,405 | B1 * | 6/2004 | Wright | 280/47.38 |
| 7,481,439 | B2 * | 1/2009 | Thompson | 280/33.991 |
| 7,516,966 | B2 * | 4/2009 | Gray | 280/47.38 |
| D595,621 | S * | 7/2009 | Ci Xiao | D12/129 |
| D598,333 | S * | 8/2009 | Li et al. | D12/129 |
| 7,597,332 | B2 * | 10/2009 | Thompson | 280/47.38 |
| 2002/0033588 | A1 * | 3/2002 | Kaneko et al. | 280/650 |
| 2005/0167951 | A1 * | 8/2005 | Zhen | 280/642 |
| 2007/0252352 | A1 * | 11/2007 | Rohl | 280/38 |
| 2008/0143082 | A1 * | 6/2008 | Chen et al. | 280/650 |
| 2009/0026733 | A1 * | 1/2009 | Gray | 280/643 |

FOREIGN PATENT DOCUMENTS

GB         2213779 A  *  8/1989
WO    WO 2007131222 A2  *  11/2007

* cited by examiner

*Primary Examiner*—J. Allen Shriver, II
*Assistant Examiner*—Jacob Meyer

(57) ABSTRACT

A modular stroller includes at least one mechanisms integrated into the stroller configured to be coupled to another stroller.

3 Claims, 7 Drawing Sheets

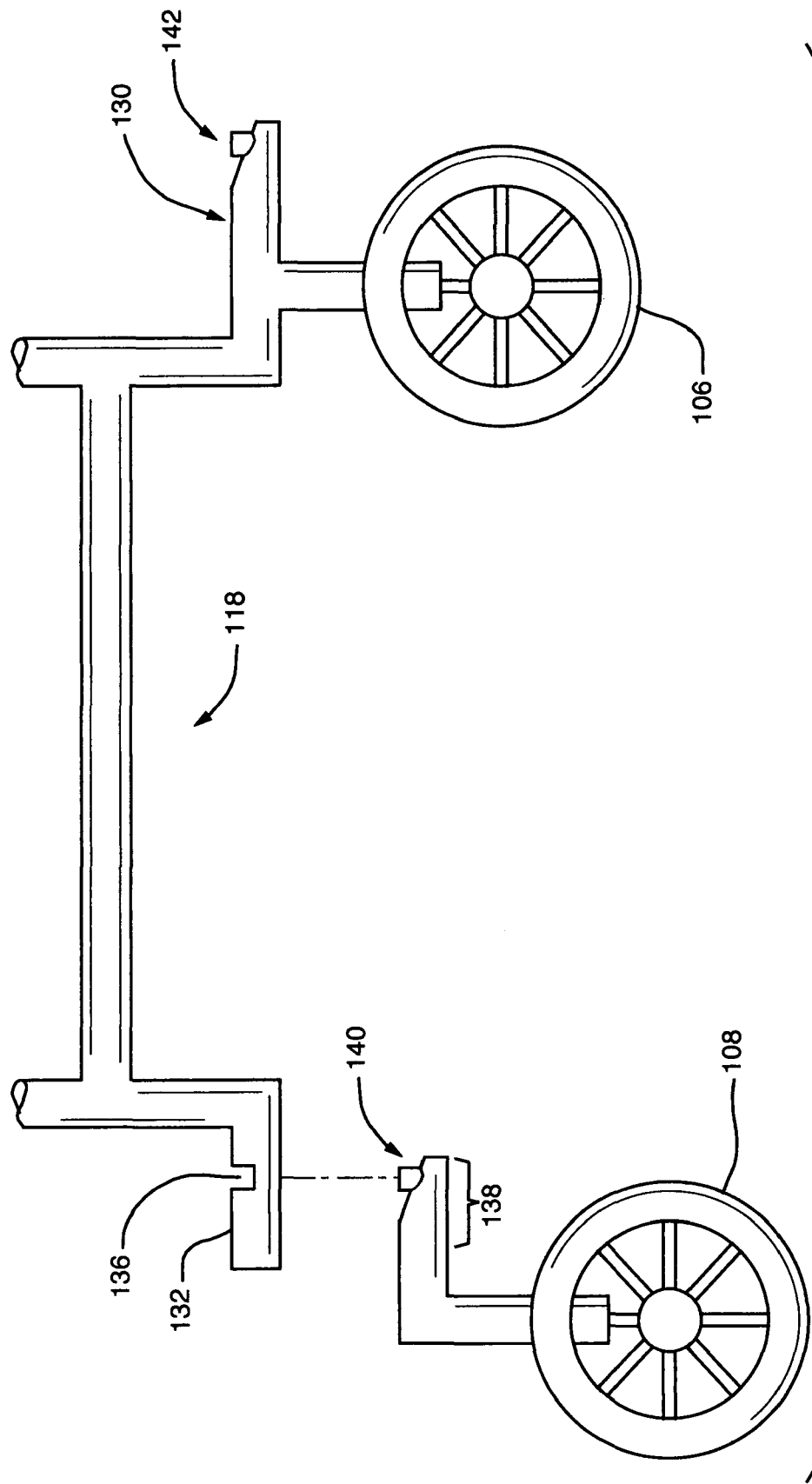

MODULAR STROLLER

BACKGROUND

When a baby is born, one of the items new parents typically buy is a stroller. There are countless options from which to choose, with many varying features that provide comfort and protection for the infant as well as convenience to the caregiver. Most people are able to purchase a stroller that fits their needs and their budget.

The situation becomes more complicated when a second child is born and the first is still of a stroller-appropriate age. There are many double strollers—strollers that can accommodate two children, but they are typically larger and more cumbersome, and so therefore less convenient. In the end, many parents are perplexed by their choices. In addition, parents often accumulate more than one stroller for their varying needs: they may buy a standard double stroller for everyday use, a jogging stroller (single or double, depending on their needs and athletic capability), a couple of umbrella strollers for short trips with either both children or only one, and they may keep their original single stroller for the times when only one child is going out. These strollers cost money, take up space, and still may not serve the parents' and children's needs.

BRIEF DESCRIPTION OF THE DRAWINGS

FIG. 3. is a diagram illustrating an interlocking mechanism.

DETAILED DESCRIPTION

Figure 1:
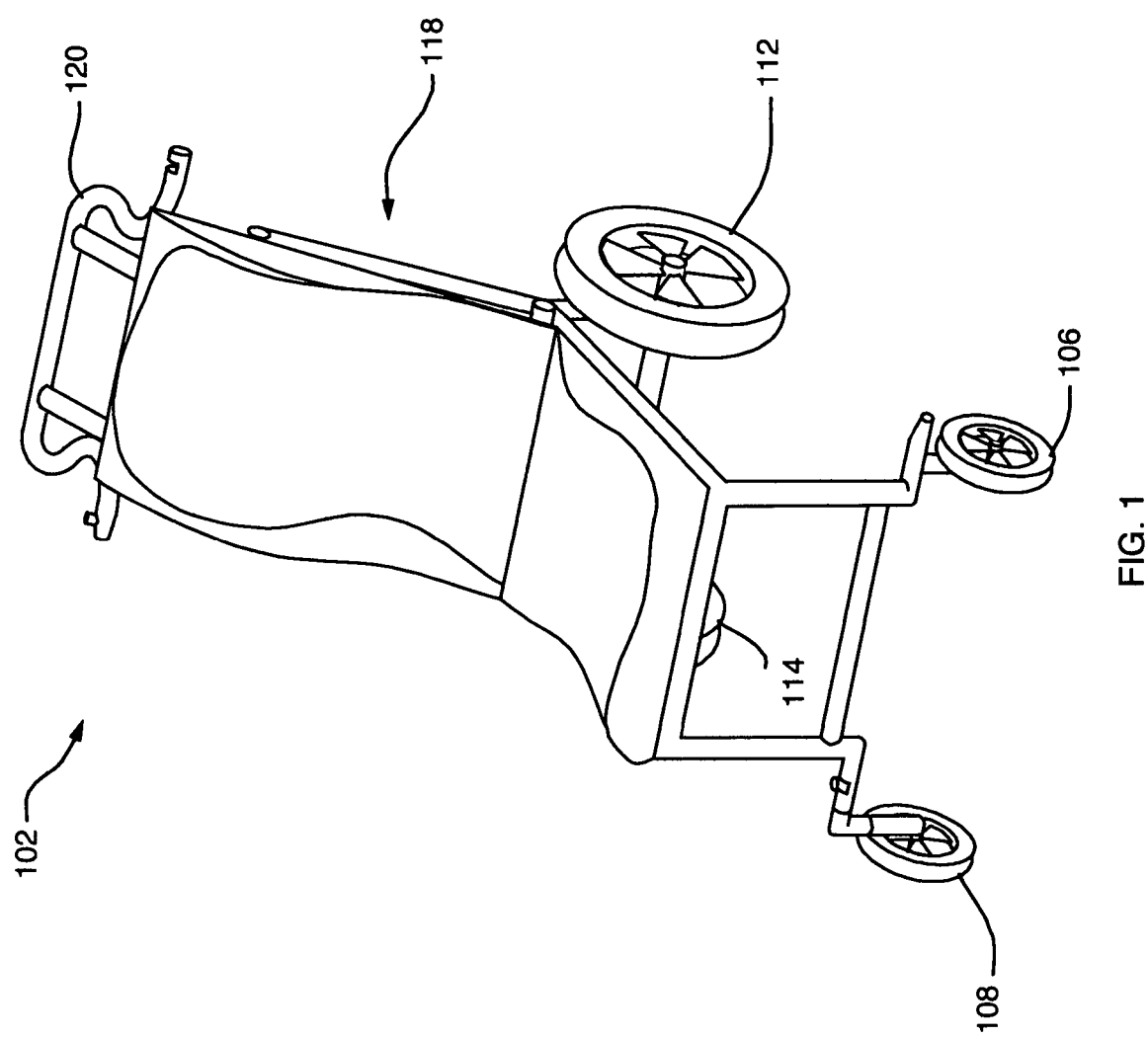
FIG. 1 is a diagram illustrating a first independently standing stroller

FIG. 1 depicts a single, independent, freestanding stroller 102. Like other conventional single strollers, the stroller 102 can offer a variety of conveniences such as comfortable seating in upright and reclining positions for the child, sun-shade, all-terrain tires for comfortable riding and easy maneuverability, ample basket storage space below the child (not shown), and easy folding for stowing in cars or at home. Like conventional strollers, stroller 102 features front 106, 108, and rear 112, 114 wheels. The number of front or rear wheels may vary in different constructions. Each wheel rotates about an axle, though the number of axles may vary (e.g., wheels may potentially share an axle).

As shown, the stroller 102 features an assembly 118 interconnecting the wheels/axles with a handle 120. While the depicted stroller 102 features a single lateral handle 120, other constructions of the stroller 102 may feature two distinct handles, one for each hand.

Figure 2:
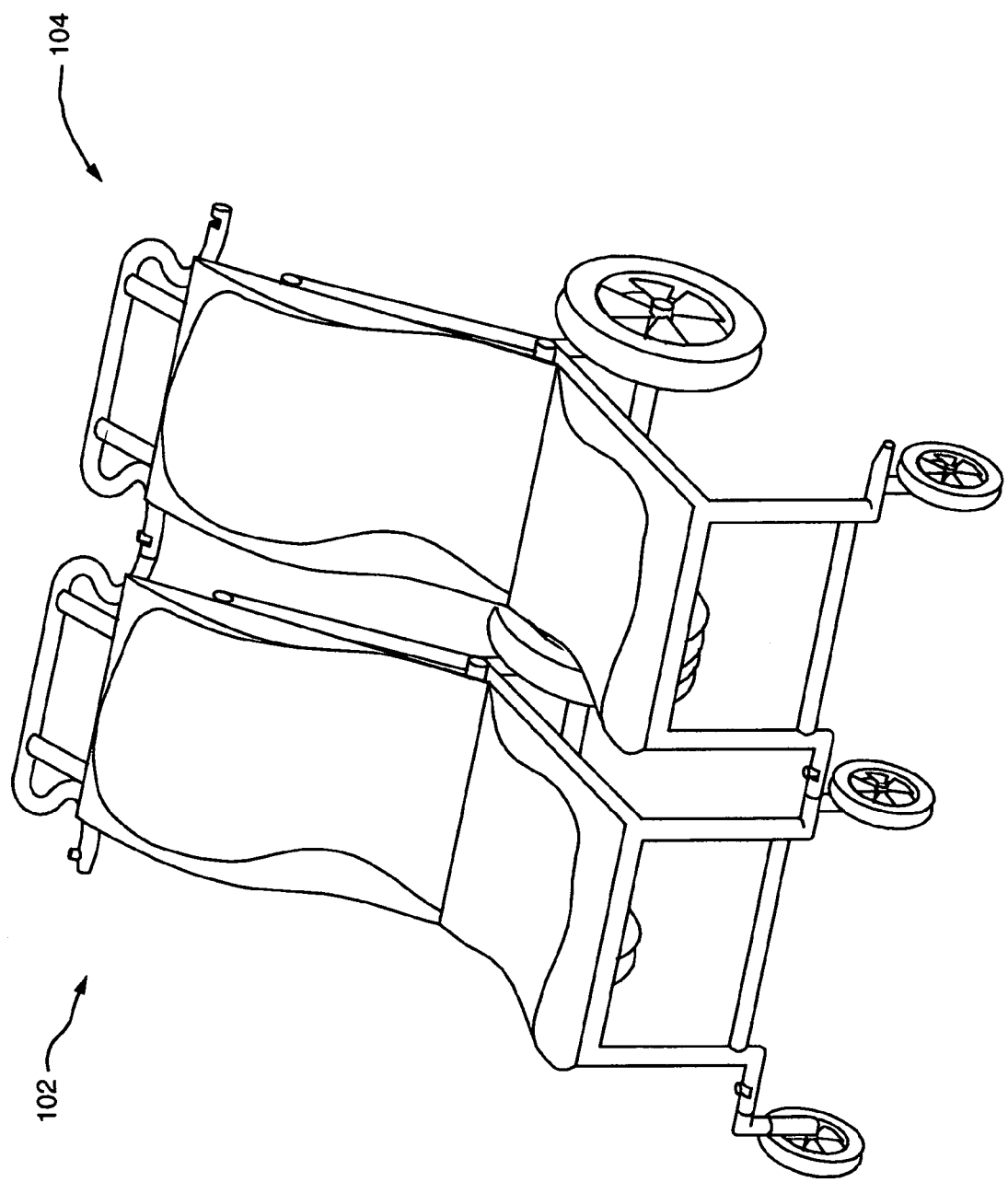
FIG. 2 is a diagram illustrating two interlocked strollers.

As shown in FIG. 2, unlike a conventional stroller, integrated into stroller 102 are mechanisms that enable the stroller 102 to interlock with another identical or compatible stroller 104 to form a double stroller. Potentially, the stroller 102 can be interlocked with two other identical or compatible strollers to form a triple stroller (e.g., n-strollers may be aggregated). As a result of these interlocking mechanisms, when a younger sibling is born, the first stroller is not obsolete or used only on rare occasions, but maintains its usefulness. When interlocked the strollers 102, 104 attach securely enough that the unit feels like one monolithic stroller. Additionally, while operating as a multi-child stroller, the individual component strollers 102, 104 permit independent adjustment of the seats. That is, the seats maintain their separate ability to be upright or reclined, independent of the other seat position. Additionally, the combined stroller folds down as a single unit, so it would fold as a double unit as well.

The strollers 102, 104 may also be easily detached when desired. For example, if children are going to different places or there is some other need for a single stroller, the stroller 102, 104 pair can be detached to yield two independent strollers 102, 104.

FIG. 3 illustrates an interlocking mechanism of the stroller 102 in greater detail. As shown, the stroller assembly 118 features laterally opposed male 130 and female 132 connectors. In the implementation shown, the male 130 connector features a spring loaded element 142 that can be depressed when the male 130 connector is interlocked with a female connector. The female connector 132 features a hole 136 to accept a spring loaded element 140 (e.g., a ball) when a male 130 connector is interlocked. To permit interlocking, the radius of a male connector may be tapered 138 to permit insertion of the male connector into a female connector. When inserted the male and female connectors may be concentric. To detach, the spring loaded element 140 can be depressed and the interlocking piece removed.

Figure 4A:
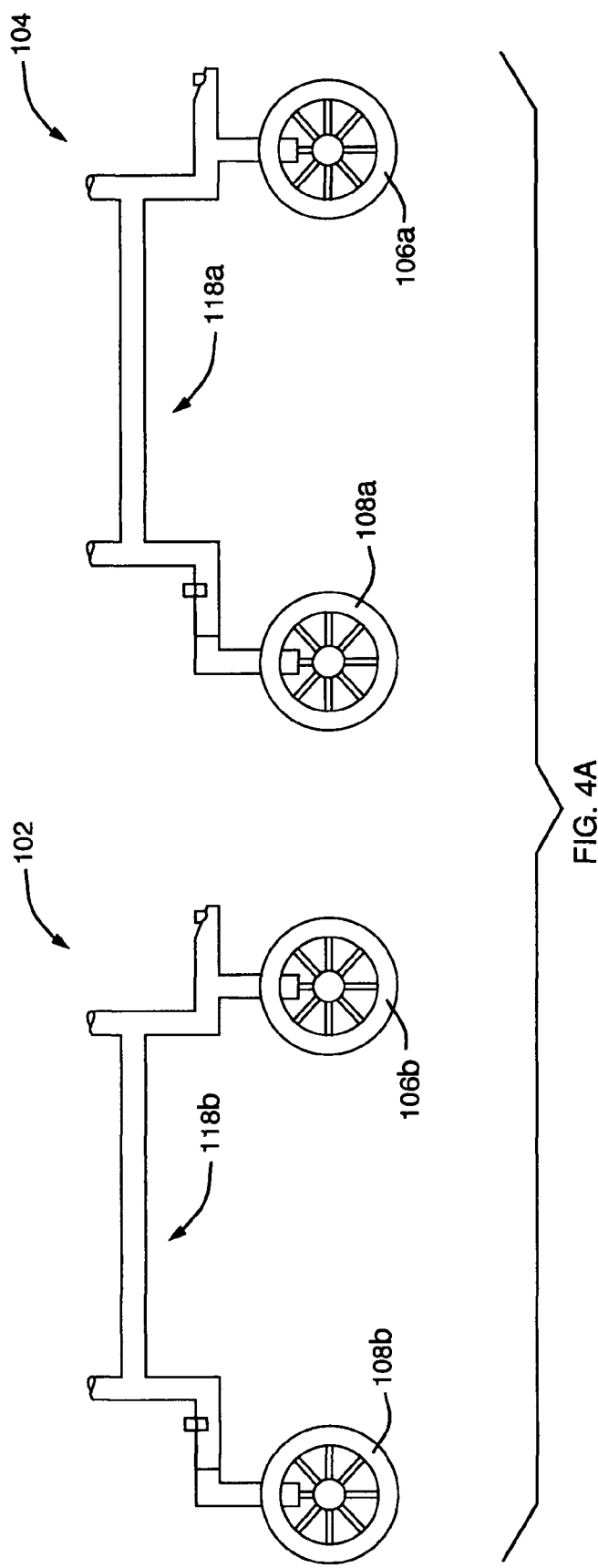
FIG. 4 is a diagram illustrating interlocking of two strollers.
Figure 4B:
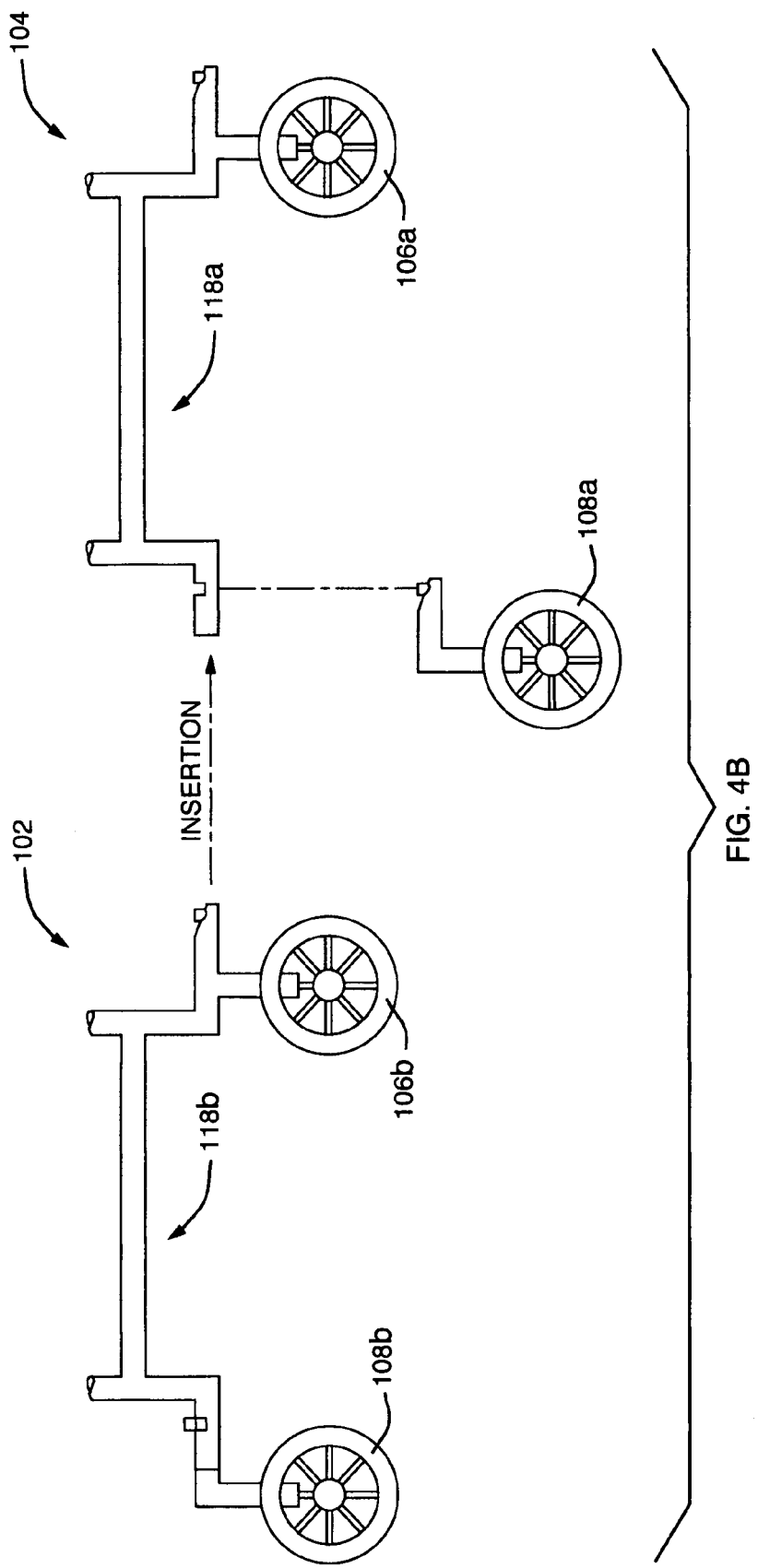
Figure 4C:
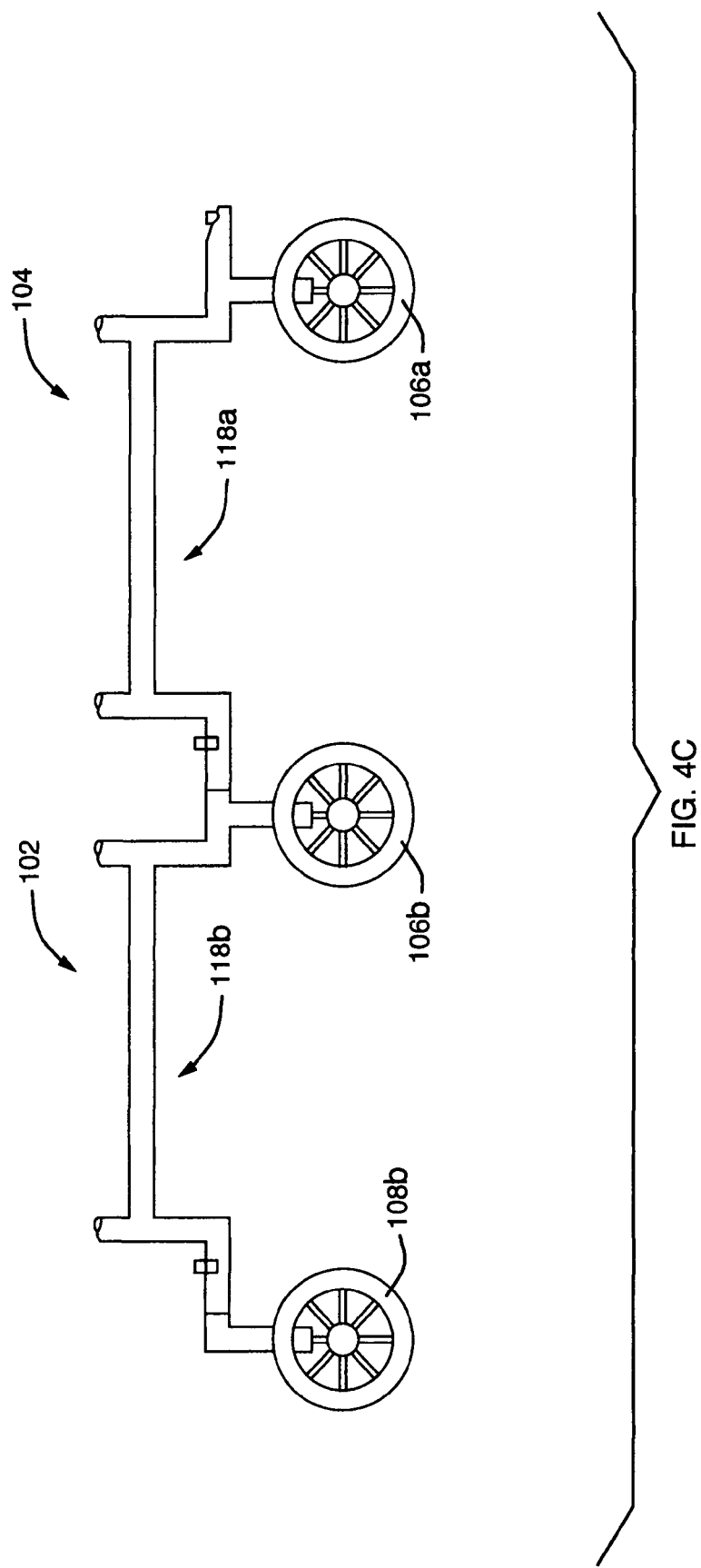

FIG. 4 illustrates interlocking of two strollers 102, 104. As illustrated, wheels of a stroller (e.g., the front right 108a wheel of stroller 104) can be detached. As shown, to interlock strollers 102, 104, a wheel 108a can be removed from stroller 104 and the male connector of stroller 102 and the female connector of stroller 104 may be interlocked. Thus, the resulting combination stroller 102, 104 features three wheels 108b, 106b, 106a instead of four wheels. This allows the strollers to share central wheels to facilitate maneuverability. The stroller has storage for the detached wheels behind the child seat using either a pocket or hooks so that the wheels are easily stowed and do not take up the usual storage space in the basket below.

While FIGS. 3 and 4 and the corresponding description detailed male/female connectors, other interlocking mechanisms can be integrated into a stroller such as 'J' or 'S' hooks. In such constructions, protective rubber caps may be supplied as covers when the interlocking mechanisms are not being used. A wide variety of other interlocking mechanisms may be integrated into the stroller.

The stroller 102 may, in addition or as an alternative to the interlocking shown in FIGS. 3 and 4 may feature interlocking mechanisms integrated into the stroller 102 at other places. For example, the stroller 102 may feature an interlocking mechanism on the rear axle(s) like the mechanism(s) described above.

Figure 5:
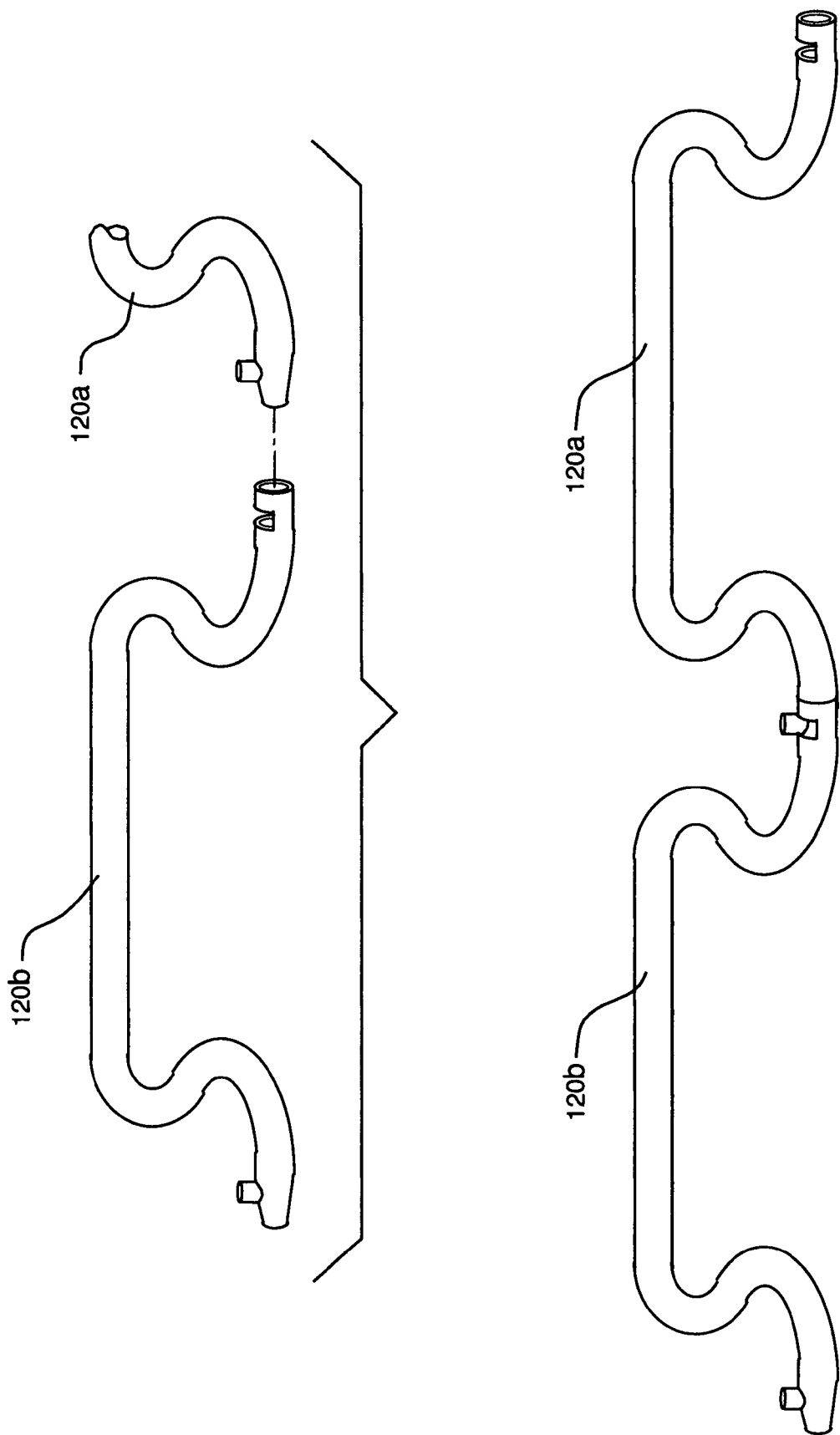
FIG. 5 is a diagram illustrating interlocking stroller handles.

As shown in FIG. 5, the stroller 102 may feature interlocking handles that ease steering when multiple strollers 102, 104 are aggregated. As shown the handles 120b, 120a of strollers 102, 104 can feature an interconnection mechanism similar to that described above. As shown, the handles 120b, 120a may be curved to distance the interlocking point from the hands of someone pushing the interlocked strollers 102, 104. A similar scheme may be implemented when a stroller 102 features multiple (e.g., left and right) handles instead of a single handle bar 120.

In addition to the assembly and handles, interlocking mechanisms can be integrated at other points in the stroller assembly. For example, a stroller may feature interlocking mechanisms located near the seat of the stroller or at other locations. The interlock mechanism may also be integrated into the axles.

The above illustrated many ways of using mechanisms integrated into a stroller assembly to interconnect strollers. The techniques may be used to interlock identical strollers. Alternately, the techniques may be used to interlock strollers that are not identical but compatible. For example, compatible strollers may feature one or more interlocking mechanisms that align when both strollers are next to one another. Not all such mechanisms need to align in this situation as long as some subset of at least one mechanism does.

In some implementations described above, the stroller 102 was asymmetric with respect to a dividing vertical axis. In simpler terms, the interlocking mechanisms on one side of the stroller were constructed differently than the interlocking mechanism on the other side of the stroller. Potentially, a stroller may feature integrated interlocking mechanisms on only one side. For example, strollers may be produced as "left end strollers" or "right end strollers".

As described above, the interlocking mechanisms are integrated within the stroller 102 assembly. That is, the interlocking mechanism are not simply attached to exterior of the assembly. Additionally, the interlocking mechanisms have counterpart mechanisms on the interlocked stroller. Such mechanisms feature a topology that deviates from a smooth surface.

Other embodiments are within the scope of the following claims.

The invention claimed is:

1. A free-standing stroller, comprising:
    at least one front axle;
    at least one rear axle;
    at least one handle; and
    an interconnecting structure providing a seat for an infant, the interconnecting structure interconnecting the at least one handle, the at least one front axle, and the at least one rear axle;
    wherein the stroller comprises, on a first side, a first set of multiple interlocking mechanisms integrated into the stroller configured to be coupled to a different freestanding stroller having a corresponding first set of multiple interlocking mechanisms, the first set of multiple interlocking mechanisms to laterally couple the stroller and the different stroller;
    wherein one of the first set of multiple interlocking mechanisms is integrated into an end of the at least one handle and configured to be coupled to a corresponding one of the first set of multiple interlocking mechanisms integrated into an end of a handle of said different stroller; and
    wherein the other of the first set of multiple interlocking mechanisms is integrated into the at least one front axle and comprises a spring loaded ball that is restored from a depressed state when inserted into a corresponding one of the first set of multiple interlocking mechanisms integrated into a front axle of said different stroller.

2. The stroller of claim 1, wherein the stroller comprises on a second side, a second set of multiple interlocking mechanisms integrated into the stroller configured to be coupled to yet another different stroller having a corresponding second set of interlocking mechanisms.

3. The stroller of claim 1, wherein the interlocking mechanism integrated into an end of the at least one handle comprises interlocking mechanisms comprises a spring loaded ball that is restored from a depressed state when inserted into the corresponding one of the first set of multiple interlocking mechanisms.

* * * * *